United States Patent Office 2,909,085
Patented Oct. 20, 1959

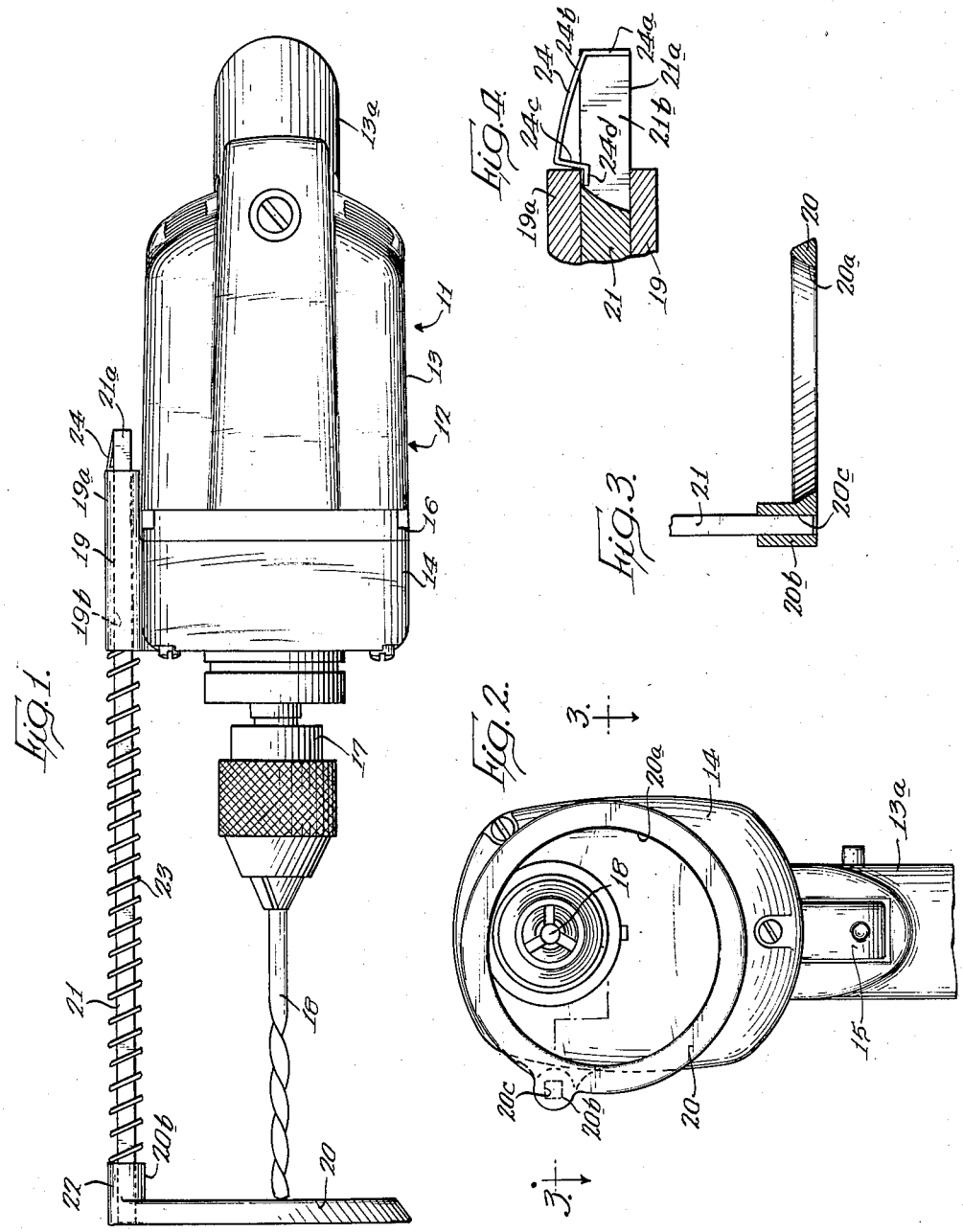
Oct. 20, 1959 — I. JEPSON — 2,909,085
PORTABLE DRILL GUIDE
Filed July 9, 1956
INVENTOR.
Ivar Jepson
BY George R. Clark
Atty.

2,909,085
PORTABLE DRILL GUIDE

Ivar Jepson, Oak Park, Ill., assignor to Sunbeam Corporation, Chicago, Ill., a corporation of Illinois Application July 9, 1956, Serial No. 596,604

3 Claims. (Cl. 77—55)

This invention relates generally to a guide for portable electric tools and more specifically to a guide for a portable drill to enable one to drill holes perpendicular to the surface of the work piece.

In the conventional drill press, the drill unit carrying a rotating bit is movable along a vertical axis toward a work supporting platform which usually defines a plane perpendicular to the line of movement of the drill unit. Thus, it is fairly simple to drill a perpendicular hole through a piece of material. It is simply placed on the work supporting platform of the drill press while the drill unit carrying the rotating bit is advanced downwardly into engagement with the material.

In recent years the portable electric drill has become increasingly popular as a result of the trend toward "do it yourself" activities by the amateur home carpenter, mechanic or repairman. The portable electric drill in its conventional form comprises a fractional horsepower electric motor contained in a generally tubular casing which is provided with a handgrip extending transversely to the axis of the motor. The casing also encloses a set of reduction gears which are drivingly connected to a drill chuck which is rotatably mounted projecting from the end of the casing away from the handgrip. The drill is operated by grasping the handgrip much in the manner in which one would grasp a pistol. After actuating a conveniently located power switch to energize the motor, the casing is advanced axially until the drill engages the work piece to be operated upon.

The portable drill has many advantages and limitations when compared to its predecessor, the drill press. The portable unit may, of course, be easily and quickly manipulated. It may be transported to portions of a large work piece which would be difficult or impossible to position in a drill press. The main limitation associated with a portable drill is that it is extremely difficult to drill a hole normal to the surface of a piece of material. This is a particularly important aspect of use, inasmuch as drilled holes are frequently used to receive dowels, bolts and other assembly means wherein it is necessary that the holes through the adjacent pieces to be assembled be parallel and coextensive. There are, of course, innumerable other applications where perpendicular holes are desirable. For this reason, a suitable means has long been sought to improve the versatility of the portable electric drill.

Many of these attempts have taken the form of portable drill presses which represent light abbreviated forms of the well known stationary drill press. In such devices a slidable carriage member is provided which is adapted to receive the portable drill in a fixed location and which is also equipped with means for advancing it toward a work supporting surface. The portable drill presses are generally unsatisfactory since they are cumbersome and limit the portability of the drill unit considerably. It is also annoying and time consuming to secure the drill unit in its fixed position in the carriage of the drill press every time a vertical hole is desired.

It is, therefore, an object of this invention to provide a drill guide for a portable electric drill which is formed in part by an integral portion of the drill unit casing.

It is an additional object of the invention to provide an improved drill guide which may be easily and simply assembled and disassembled from a portable drill unit.

It is a further object of this invention to provide a guide for a portable drill which enables the drilling of holes perpendicular to the surface of the work piece while in no way limiting the portability of the drill unit.

Further objects and advantages of the present invention will become apparent as the following description proceeds, and the features of novelty which characterize the invention will be pointed out with particularity in the claims annexed to and forming a part of this specification.

Fig. 1 is an elevational view of a portable electric drill and drill guide embodying the present invention;

Fig. 2 is a bottom plan view of Fig. 1;

Fig. 3 is a sectional view of a portion of the drill guide taken along line 3—3 of Fig. 2; and Fig. 4 is an enlarged cutaway view of a portion of Fig. 1.

Referring now to the drawings, the portable drill unit generally designated by the reference numeral 11 in Fig. 1 comprises an outer casing generally designated at 12 formed by a pair of housing members 13 and 14. The power unit for the electric drill is positioned in the generally tubular shaped housing member 13 with its armature shaft extending coaxially with the housing member 13.

To provide means for gripping the drill unit, a conventional pistol grip portion 13a is provided extending transversely from the rear of housing member 13. The pistol grip handle is equipped with a suitable power switch 15 which may take the form of a trigger type switch which is shown in Fig. 2.

The casing 12 is separated into two distinct portions by the bearing supporting plate 16 which is sandwiched between the housing members 13 and 14. The support plate 16 serves to divide the casing 12 into a motor containing portion which is defined by the housing member 13 and a gear containing portion which is defined by the housing member 14.

Mounted in the housing member 14 and extending outwardly therefrom is a drill chuck 17. The drill chuck serves to releasably secure a conventional twist drill 18 in operative position relative to the drill unit 11.

The above described portable electric drill is conventional in all respects and may be varied in any of its details without affecting any of the inventive concepts embodied herein. To suitably support the drill guide device of the instant invention the casing 12 of the drill unit is formed with an elongated longitudinally extending bearing 19. In the disclosed embodiment it was found expedient to form bearing 19 as an integral part of the housing member 14. Because of the necessity of providing a fairly long bearing, for reasons which will be explained below, a portion of the bearing 19 comprises an extension 19a which projects toward the rear of the casing 12 in spaced relation to the housing 13. To slidably receive the drill guide device, the bearing 19 is formed with a square, longitudinally extending hole 19b.

It should be understood that the bearing 19 might be formed in the motor housing member 13 or in both the housing members 13 and 14 if desired. The only requirement is that a suitable elongated bearing member be provided which extends longitudinally of the drill casing 12.

To support the drill unit 11 in a vertical position relative to a work surface, a work engaging shoe 20 and a support rod 21 are assembled to define a substantially L shaped guide member, as seen in Fig. 1. To permit the drill bit 18 to engage the work surface and to create as little obstruction to vision as possible, the work engaging shoe 20 is formed in an annular shape having a large diameter opening 20a extending therethrough.

In order that the shoe 20 may engage the work piece over a fairly large area, it is preferably made of such a size as to substantially coincide with the outline of the drill casing as observed axially of the drill. Referring to Fig. 2, it can be seen that the shoe 20 lies barely within the outline of casing 12. This is regarded as the optimum size for the support shoe since it provides maximum support which can be had without limiting the portability of the drill by effectively increasing its bulk as to use in restricted areas. Thus, considering the size of an opening which could accommodate the casing 12, we can easily see that the shoe 20 does not materially increase the size of the opening required. To keep the shoe 20 properly oriented with regard to the drill and casing 12, the support rod 21 has a square cross-sectional shape so as to cooperate with square hole 19b to allow only slidable movement of the rod in the hole. To facilitate portability and still maintain strength and rigidity, the annular shoe 20 may be fabricated of a strong lightweight magnesium alloy, the cross-sectional area of the annulus being triangular, as can be seen in Fig. 3.

For the purpose of assembling the support rod 21 to the work engaging shoe 20, a boss 20b is formed which projects upwardly from the plane defined by the annular shoe 20. A suitable square hole 20c is formed in the boss 20b to receive the support rod 21 as a press fit therein. The support rod 21 and work engaging shoe 20 are assembled with the support rod extending perpendicular to the plane of the shoe 20 to form a guide assembly 22. Upon assembly of the support rod 21 to the drill unit 11 by the insertion of one end of the rod 21 into the bearing hole 19b, the guide assembly is arranged in slidable relation to the drill unit whereby the work engaging shoe 20 will define a plane perpendicular to the drill bit 18. Thus, when the shoe 20 is placed in engagement with the material to be drilled and the drill bit 18 is advanced through the hole 20a in the shoe, the hole drilled by the bit 18 is always perpendicular to the surface of the material. As was explained above, the bearing hole 19b must be of substantial length. This length is necessary to assure a free sliding engagement between the rod 21 and the bearing 19. If the bearing is not of adequate length, the moment acting on rod 21 through the action of the shoe 20 will cause binding in the bearing 19.

In order that the shoe 20 may be continually biased to a work engaging position, the guide assembly 22 is equipped with an elongated helical spring 23 which is received on the support rod 21. The ends of the spring 23 abut the elongated bearing 19 and the boss 20b of the shoe. In operation the spring 23 maintains the shoe 20 in contact with the work surface while the drill bit 18 is advanced therethrough. It should be understood that as the drill bit 18 advances through the work, the spring 23 is compressed.

In order that the spring 23 will not force the guide assembly 22 axially of the drill unit 11 until the support rod 21 becomes disengaged from the bearing 19, the end 21a of the support rod is formed with a spring retaining member 24 which engages the bearing portion 19a. The retaining member 24 is of the type commonly found on the shaft of an umbrella to lock the umbrella in either open or closed position. To provide a recess within which the spring 24 may be depressed permit disengagement of the support rod 21 from the bearing 19, the end 21a of support rod 21 is slotted at 21b adjacent the length of retaining spring 24, as can be seen in Fig. 4. Retaining spring 24 is somewhat C shaped having a mounting portion 24a which is secured to the support rod 21 by brazing or by staking the end 21a so as to grip the portion of the spring in the slot 21b.

To facilitate assembling support rod 21 to the drill casing 12, a camming portion 24b is provided on the retaining spring. By applying a force on the camming portion 24b, the spring 24 may be deflected until it is entirely received in slot 21b. The spring is so deflected when it passes through the hole 19b. The stop portion of the retaining spring 24 is formed by an inwardly bent portion 24c which is substantially perpendicular to support rod 21. The stop portion 24c thus presents a well defined shoulder which engages the bearing 19 and prevents disassembly of the guide assembly 22 from the drill unit.

To retain the lower end of spring 24 within the slot 21b, the terminus of the spring is provided with a locking portion 24d which engages the end of slot 21b as seen in Fig. 4. It should be understood that any suitable latch or retaining means may be used in lieu of the spring retainer 24. This type of retaining member, however, has the advantage of permitting quick and easy engagement and disengagement of the guide assembly 22 and the drill unit 11. When it is desired to assemble the guide assembly 22 to the drill casing 12, the end 21a of the support rod is merely inserted into hole 19b of the bearing 19 and pushed through the hole. The insertion of end 21a results in the retaining spring 24 being deflected into its recess so that it does not obstruct passage of the support rod 21 through the hole 19b. Once the end of rod 21 has passed through the hole, the spring 24 resumes the position shown in Fig. 4 whereby the stop portion 24c prevents the rod 21 from sliding out of the bearing 19 until the spring retainer is again depressed into slot 21b.

While only a single embodiment of the present invention has been described and illustrated it should be understood that the present invention is capable of various changes and modifications. It is intended in the appended claims to cover all such changes and modifications as fall within the true spirit and scope of the present invention.

What is claimed as new and desired to be secured by Letters Patent of the United States is:

1. A portable drill of the type having a casing containing an electric motor which is drivingly connected to a drill chuck protruding longitudinally from one end of the casing, a drill guide comprising a longitudinally extending bearing member formed by said drill casing, a support rod mounted for axial movement in said bearing and extending from said casing in spaced parallel relation to said drill chuck, a work engaging shoe secured to said support rod at the end adjacent to said drill chuck, the outer face of said shoe defining a plane perpendicular to said support rod, a spring engaging said casing and said work engaging shoe to bias them in opposite directions, a resilient cam member mounted on the end of said support rod remote from said work engaging shoe, said member having a stop portion extending substantially perpendicular to said rod acting as a stop to prevent disengagement of said support rod from said bearing, a cam surface on said member extending at an angle to said rod being engageable with said bearing during assembly of said rod to deflect said member to an inoperative position.

2. The portable drill of claim 1 wherein said work engaging shoe is annular in shape and the periphery of said shoe is substantially coincident with the axial projection of said casing.

3. The portable drill of claim 1 having reduction gearing drivingly connecting said motor and said drill chuck, said drill casing comprising a motor enclosing portion and a gear enclosing portion, said gear enclosing portion of said housing having an elongated bearing for mounting said support rod for axial movement.

References Cited in the file of this patent

UNITED STATES PATENTS

| | | |
|---|---|---|
| 2,050,709 | Lopez | Aug. 11, 1936 |
| 2,261,746 | Seaboly | Nov. 4, 1941 |
| 2,360,942 | Ellerstein | Oct. 24, 1944 |
| 2,389,314 | Inhof et al. | Nov. 20, 1945 |
| 2,622,458 | Jenkins | Dec. 23, 1952 |
| 2,670,638 | Roy | Mar. 2, 1954 |